United States Patent [19]
Valentine

[11] 3,750,928
[45] Aug. 7, 1973

[54] VACUUM SEAL FOR INTERNAL PIPELINE LINE-UP CLAMP

[76] Inventor: Lamar T. Valentine, 7374 E. 58th St., Tulsa, Okla.

[22] Filed: Aug. 6, 1971

[21] Appl. No.: 169,848

Related U.S. Application Data

[63] Continuation of Ser. No. 18,363, Feb. 27, 1970, abandoned, which is a continuation of Ser. No. 666,432, Sept. 8, 1967, abandoned, which is a continuation-in-part of Ser. No. 650,274, June 30, 1967, Pat. No. 3,538,594.

[52] U.S. Cl. .................... 228/44, 29/200 P, 219/72, 228/50
[51] Int. Cl. ............................................ B23k 19/00
[58] Field of Search .................... 228/4, 42, 44, 50; 29/200 P, 200 J, 237, 471.1; 219/60, 72; 269/48.1

[56] References Cited
UNITED STATES PATENTS

| | | | |
|---|---|---|---|
| 3,458,106 | 7/1969 | Valentine | 228/44 |
| 3,458,105 | 7/1967 | Valentine | 228/44 |
| 3,387,761 | 6/1968 | Pickard | 228/42 |
| 3,233,315 | 2/1966 | Levake | 29/237 |
| 3,095,844 | 7/1963 | Thielsch | 113/111 |
| 3,018,358 | 1/1962 | Schaaf, Jr. | 219/72 |
| 2,654,822 | 10/1953 | Agule | 219/10 |

Primary Examiner—J. Spencer Overholser
Assistant Examiner—Robert J. Craig
Attorney—James R. Head

[57] ABSTRACT

A vacuum seal system is utilized in combination with an internal pipeline line-up clamp used in the welding of abutted elements, particularly lengths of pipe. A resilient and expansible seal is adapted to be attached to and movable with the actuating plungers or dogs of the internal alignment clamp. The seal is adapted to extend slightly above the 180° lower portion of the pipe joint to be welded. A vacuum or withdrawal of air in the sealed space will override the gravity influence of the welding process.

6 Claims, 6 Drawing Figures

PATENTED AUG 7 1973

INVENTOR.
LAMAR T. VALENTINE

BY *Head & Johnson*

ATTORNEYS

INVENTOR.
LAMAR T. VALENTINE
BY
Head & Johnson
ATTORNEYS

VACUUM SEAL FOR INTERNAL PIPELINE LINE-UP CLAMP

This application is a continuation of Ser. No. 18,363 filed Feb. 27, 1970, now abandoned, which was a continuation of Ser. No. 666,432, filed Sept. 8, 1967, now abandoned, which was a continuation —in— part of Ser. No. 650,274 filed June 30, 1967, now U.S. Pat. No. 3,538,594.

BACKGROUND OF THE INVENTION

In the welding of pipe utilized in a continuous length pipeline, the primary object is to achieve a weld which is at least equal to and preferably stronger than the pieces being welded. Rigid inspection is made of each joint after the welding process, by x-ray or known inspection processes to assure that this objective is achieved. Typically, in the welding of successive joints of pipeline, the process is usually done while the pipe is substantially horizontal, depending of course upon the terrain. The next successive joint of pipe is aligned and abutted with the succeeding joint and the welding process begins.

As is explained in the above identified prior copending application, during thermal welding of the upper portion of abutted lengths of pipe, the force of gravity tends to draw the molten weld metal towards the interior thereof. On the other hand, during the welding of the lower portion, gravity tends to cause the molten weld metal to flow towards the extremity of the pipe. Hence, in some situations, an accomplished welder can secure an adequate weld in the upper portion of the pipe having the desired strength and other characteristics, which becomes extremely difficult and in some instances impossible to obtain an adequate weld in the lower portion of the pipe wherein the weld forms an interior bead within the interior of the pipe. That is, it has been found the desired configuration of a complete weld around the pipe includes a portion of molten weld metal extending at least to or slightly within the interior of the pipe around the full internal circumference.

Accordingly, it is a primary object of this invention to provide a method and means for accomplishing a finished weld about abutted pipe ends having a satisfactory and quality weld configuration capable of passing destructive and nondestructive test standards.

It is another object of this invention to provide a means for accomplishing a satisfactory weld configuration which is adaptable to be used in combination with an internal pipeline line-up clamp.

A still further object of this invention is to provide a vacuum seal system adapted to be independently expandable and contractable in conjunction with an internal pipeline line-up clamp and which provides a sealed zone slightly above the lower 180° of the pipeline joint to be welded.

DESCRIPTION OF THE PREFERRED EMBODIMENTS

Figure 1:
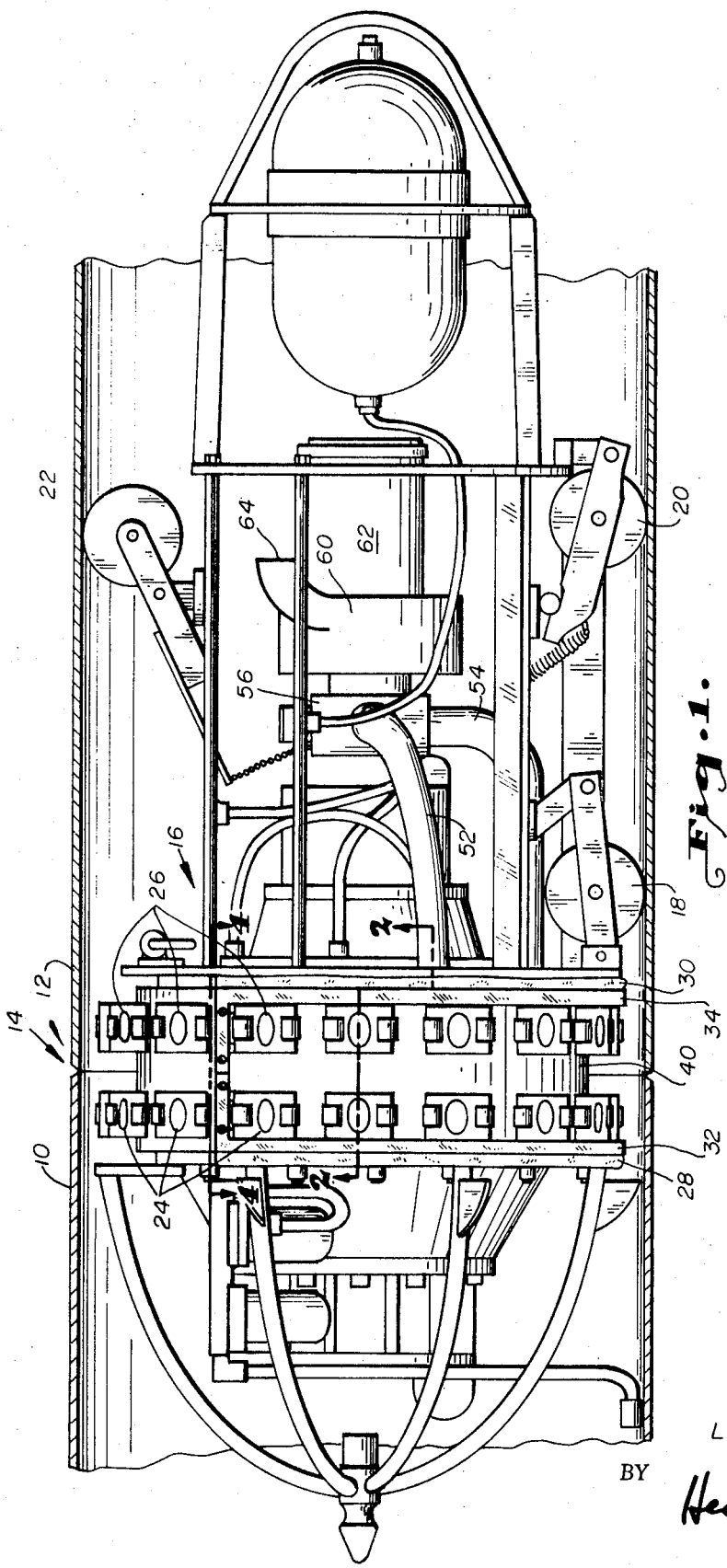
FIG. 1 is an elevational view of the apparatus of this invention.

Referring now to FIG. 1, pipe 10 is to be welded to pipe 12 at the single-Vee groove, generally indicated by the numeral 14 formed by beveling the ends of the pipe in a manner well known to those skilled in the art. To align the two pipe ends an internal pipeline line-up clamp, generally referred to by the numeral 16, is adapted to be inserted, centralized and supported for travel within the pipe on rollers 18, 20 and 22. The clamp is adapted to be pulled and/or pushed into the pipe section. The line-up clamp includes a first circumferential row of reciprocal plungers or dogs 24 substantially coaxial to said clamp axis and parallel spaced second row of circumferential dogs 26 likewise coaxial to said clamp axis. The plungers are adapted to be fluid actuated either hydraulically, but preferably pneumatically to be reciprocated outwardly into engagement with the internal periphery of respective pipes 10 and 12. That is, the circumferential row of dogs 24 are independently actuated outward into engagement with pipe 10, whereas dogs 26 are likewise simultaneously and independently engageable with pipe 12 so as to straddle the joint forming the V-groove 14, within which the welding is to take place.

Figure 2:
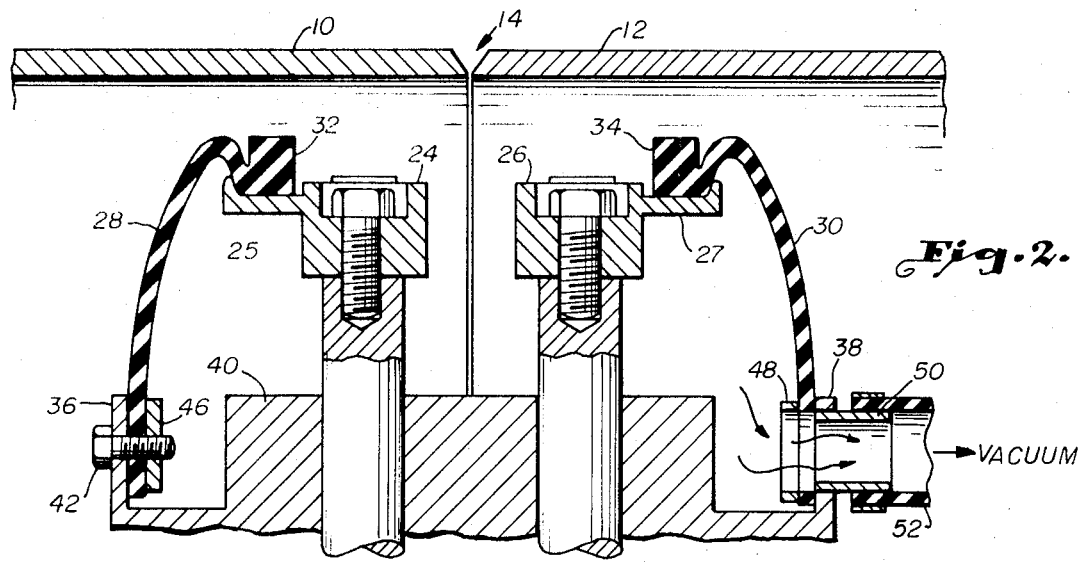
FIG. 2 is a sectional view taken along the line 2—2 of FIG. 1.

Independently associated with each row of dogs are resilient seal members more aptly described in FIG. 2 which coact to form a lower seal space interiorly of the abutted pipe ends. Each seal includes respective resilient or expandable boots 28 and 30 and integral peripheral arcuate seal strips 32 and 34. The seal strips are arcuate members supported upon extensions 25 and 27 of the respective dogs 24 and 26 by the retracting force of the resilient strip which is stretched thereabout. Each resilient and expandable boot 28 and 30 is sealably connected to outward flanges 36 and 38 which are formed as a part of the liner clamp body 40 being retained thereto by bolt 42 and inner-backup rings 46 and 48. A vacuum connection conduit 50 is positioned and attached to outward flange 38 and adapted to receive a supply conduit 52 clamped thereto. At least one vacuum supply connection is required preferably three which includes lines 52, 54 shown in FIG. 1, and an identical line opposite conduit 52 on the other side, not seen in these views. These conduits interconnect to a central vacuum accumulation chamber 56 which is interconnected to the inlet of vacuum pump 60 driven by electric motor 62 or other well known power source, exhausting to the atmosphere through outlet 64. Each conduit can be controllable as by a valve. Typically the vacuum blower 60 is a centrifugal type or may be of the type described in copending application Ser. No. 666,431 filed Sept. 8, 1967, now U. S. Pat. No. 3,458,106 entitled Vacuum Supply System For Internal Pipeline Line-Up Clamp. In addition, means are used such as automatic pressure controls responsive to the low pressure or vacuum condition in the space as the welding progresses.

Figure 3:
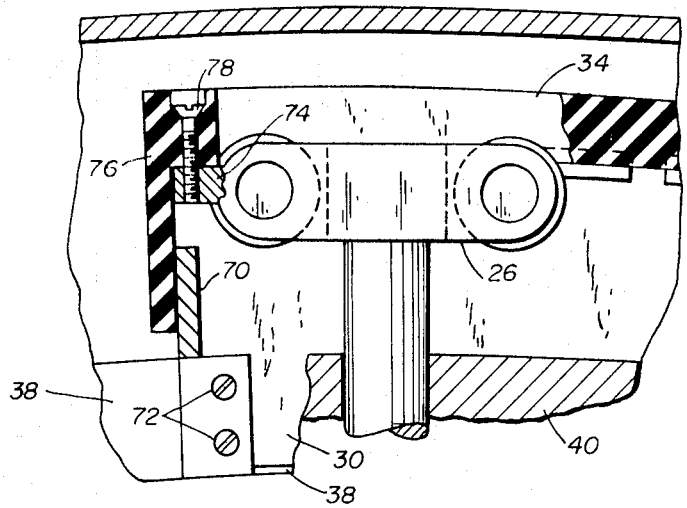
FIG. 3 is a partial sectional view taken along the line 3—3 of FIG. 4.
Figure 4:
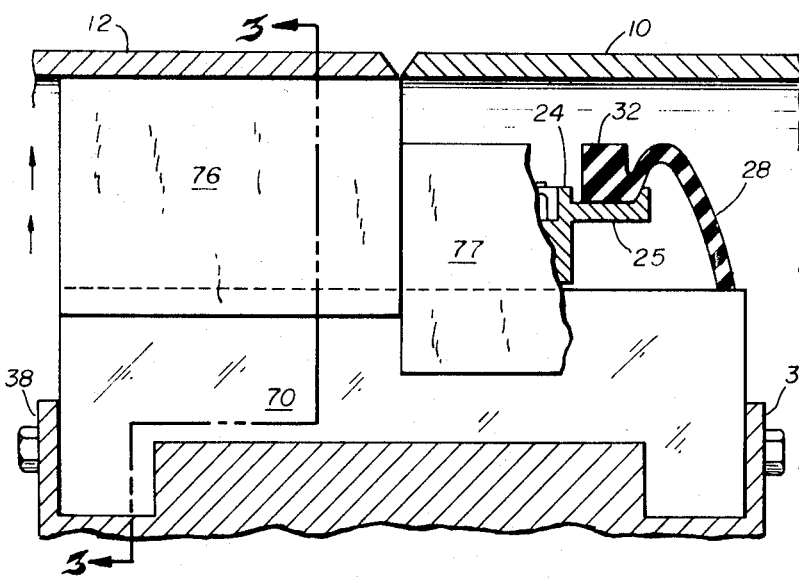
FIG. 4 is a partial sectional view taken along the line 4—4 of FIG. 1.

One transverse terminus of the space formed by resilient boots 28 and 30 and respective rings 32 and 34 is depicted in the sectional views of FIGS. 3 and 4. Typically the termini are positioned so as to provide an internal confined space extending at least the lower 180° of the abutted pipe ends, preferably the lower 225°. The terminal seal is accomplished by attaching a terminus plate 70 to outward flange 38 by bolts 72 which also is used to retain resilient boot 30. A lip extension 74 is formed as a part of dog 26, to which a resilient end seal member 76 is retained by bolts 78. Resilient end member 76 is an independent member attached to and movable with dog 26 as shown. A similar end member is attached to dog 24 and independently movable therewith, as is shown in FIG. 4.

OPERATION

Figure 6:
FIG. 6 is a sectional view of two pipe elements representing a desired weld configuration accomplished by this invention.
Figure 5:
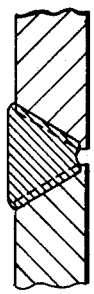
FIG. 5 is a sectional view of two pipe elements representing a defective weld.

As shown in FIG. 1, pipe 10 represents the end to which pipe 12 is to be welded at the single V-groove 14. Pipe 12 is supported in substantially aligned position. In the event the welding process of the previous joint has been completed, pipeline line-up clamp 16 is pulled by means, not shown, to the position substantially shown in FIG. 1 wherein dogs 24 and 26 are caused to be aligned straddling proposed joints to be welded. To cause exact alignment of the two sections of pipe, dogs 24 are expanded radially outward such as by pneumatic of hydraulic means supplied from an exterior source and not shown. Thereafter dogs 26 are expanded radially outward into engagement of the interior of pipe 12 and thus support the abutted joint in coaxial alignement. In the expanded position the seal strips and boots create a confined space about the lower section of pipe and preferably approximately the lower 225° of the pipe. Vacuum motor 62 is started causing centrifugal pump 60 to withdraw air from the space through the abutted pipe joint interiorly as the welding process therearound begins. The low pressure air is withdrawn through conduits 52, 54 and a like conduit on the other side, not shown. When the welding process is completed, the dogs 24 and 26 are retracted and the process is repeated for the next section of pipe. As such, it is found that a weld within the single V-groove will result as that shown in FIG. 6 especially within the lower portion of the pipe instead of that shown in FIG. 5.

The invention has been described with reference to specific and preferred embodiments. It will be apparent, however, that other modifications can be made without departing from the spirit and scope of the invention. Accordingly, this invention should be construed not to be limited to the embodiment herein described but should be limited only by the scope of the appended claims.

I claim:

1. In an internal pipeline line-up clamp having parallel circumferential coaxial rows of outwardly expandable dogs alignable within said pipe to straddle and maintain abutted pipe ends for welding, the improvement comprising in combination, seal means movable with said dogs to engage with the inner periphery of said pipe and create a substantially confined space which extends slightly above the lower coaxial half of said abutted pipe ends; and means to withdraw air from said space to create a lower than atmosphere pressure in said space.

2. A clamp according to claim 1 wherein said seal means includes:

a first arcuate expandable boot sealably attached coaxially to the body of said clamp adjacent one row of said dogs and having a coaxial arcuate seal strip ring section attached to said dogs;

a second arcuate expandable boot sealably attached coaxially to the body of said clamp adjacent the other row of said dogs and having a coaxial arcuate seal strip ring section attached to said dogs; and transverse seal means terminating said arcuate boots and strip rings.

3. A clamp according to claim 1 wherein said space extends approximately the lower 225° of said pipe.

4. A clamp according to claim 1 wherein said means to withdraw air from said space includes a vacuum pump, inlet accumulation chamber and at least one conduit communicable between said chamber and said space.

5. A clamp according to claim 4 including three equally spaced conduits communicable between said chamber and said space.

6. A clamp according to claim 4 wherein said means to withdraw is controllable as a function of the desired lower than atmosphere pressure in said space.

* * * * *